March 6, 1956  L. G. SIMJIAN  2,737,393
GOLF DRIVE SENSING SYSTEM
Filed Aug. 9, 1952  3 Sheets-Sheet 1

*INVENTOR.*
LUTHER G. SIMJIAN
BY Ralph E. Bitner
ATTORNEY

March 6, 1956  L. G. SIMJIAN  2,737,393
GOLF DRIVE SENSING SYSTEM
Filed Aug. 9, 1952  3 Sheets-Sheet 2
FIG. 3
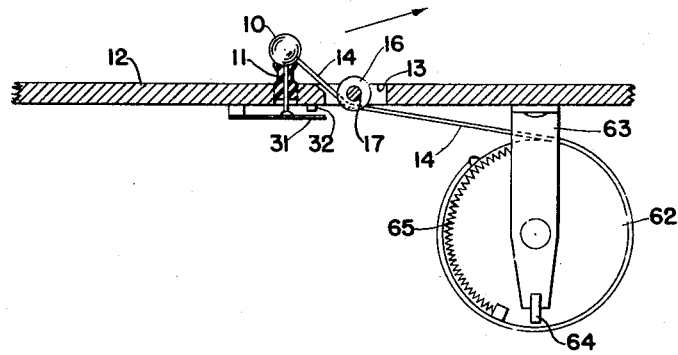
FIG. 4
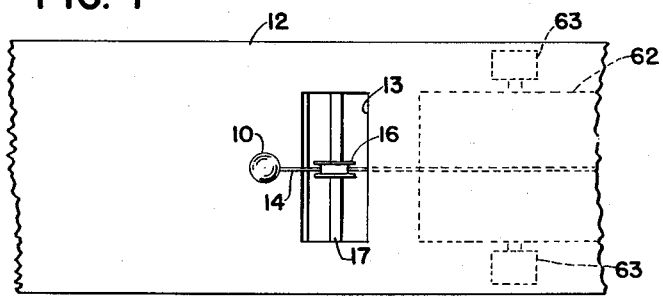
FIG. 5
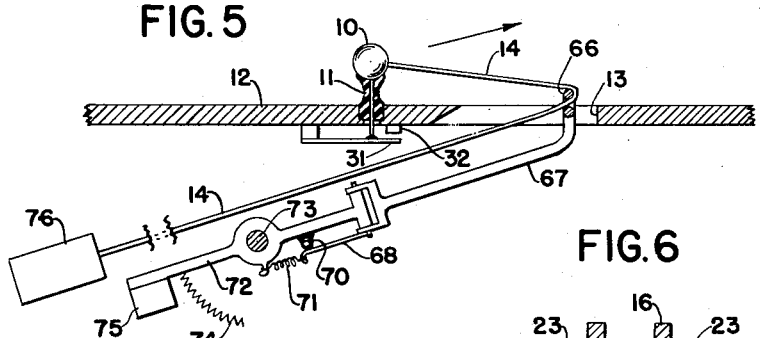
FIG. 6
FIG. 6A
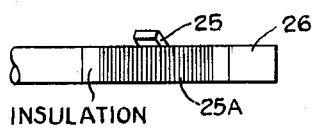
INVENTOR
LUTHER G. SIMJIAN
BY Ralph E. Bitner
ATTORNEY March 6, 1956 L. G. SIMJIAN 2,737,393
GOLF DRIVE SENSING SYSTEM
Filed Aug. 9, 1952 3 Sheets-Sheet 3

LUTHER G. SIMJIAN
INVENTOR

BY Ralph E. Bitner
ATTORNEY

United States Patent Office 2,737,393
Patented Mar. 6, 1956

2,737,393

GOLF DRIVE SENSING SYSTEM

Luther G. Simjian, Greenwich, Conn., assignor to The Reflectone Corporation, Stamford, Conn., a corporation of Connecticut Application August 9, 1952, Serial No. 303,634

8 Claims. (Cl. 273—185)

This invention relates to a sensing system to determine the impelling forces given to a struck missile and to make possible a prediction regarding the missile trajectory and its final position. The invention has particular reference to the arrangement of a force-measuring device and a means for determining the direction and velocity of the missile.

Several devices have been used in the past to measure approximately the force delivered to a struck ball. Some of these have been used for developing driving proficiency by employing a golf ball and using golf clubs. However, these prior art devices only measured the total force of the ball and did not determine direction nor loft.

One of the objects of this invention is to provide an improved sensing system for struck missiles which avoids one or more of the disadvantages and limitations of prior art arrangements.

Another object of the invention is to increase the accuracy of force-measuring systems so that a prediction can be made in regard to the missiles final position.

Another object of the invention is to determine the direction of a struck ball both horizontally and vertically so that the resultant trajectory may be determined.

Another object of the invention is to measure the time interval between two positions at the start of the trajectory in order to determine the initial velocity.

Another object of the invention is to reduce the cost of sensing systems for determining the trajectory of struck missiles.

One feature of the invention includes a sensing system for determining the trajectory of a missile and includes a captive means for holding the missile in a position where it can be struck. A force-measuring device is coupled to the captive means for measuring the total force imparted to the missile. The invention also includes a means for determining the horizontal and vertical components of the missile's direction.

Another feature of the invention includes a set of contacts which measure the time interval taken by the missile in traveling from a start position to a second position which is a pre-determined distance from the start position. An analogue computing device is employed for receiving the data provided by the measuring device and producing data which represents the trajectory of a non-captive missile having the same impelling force.

For a better understanding of the present invention together with other and further objects, thereof, references made to the following description taken in connection with the accompanying drawings.

Fig. 3 is a side view partly in section of an alternate arrangement of a captive missile and a force-measuring device.

Fig. 4 is a plan view of the device shown in Fig. 3.

Fig. 5 is another alternate arrangement of a captive missile and its associated measuring devices.

Fig. 6 is a detailed sectional view of a part of the force-measuring system shown in Fig. 1.

Fig. 6A is a plan view of the resistor on the central mounting shaft.

Figure 1:
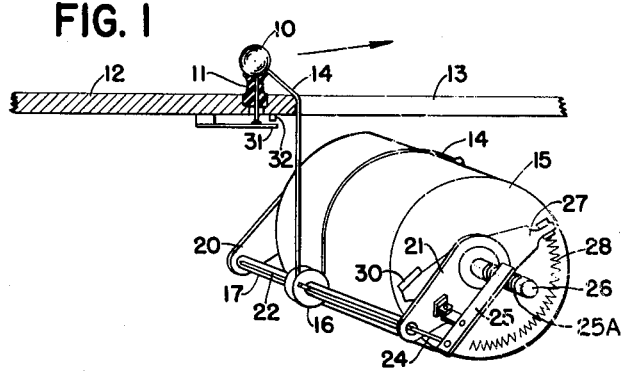
Fig. 1 is a side view partly in section and partly in perspective showing one system of mounting a captive ball.

Referring now to Fig. 1 a ball 10 is mounted on a flexible base 11 above a base platform 12. The base member contains a slot 13 to accommodate extended movement of a cord 14 which is secured to the ball 10 at one end and is anchored to a stationary drum 15 at its other end. The cord 14 passes around a pulley 16 which is rotatably mounted on a shaft 17. Shaft 17 is secured to two pivoted arms 20 and 21, free to rotate about the axis of drum 15.

Shaft 17 contains a slot 22 shown in greater detail in Fig. 6. A slidable yolk 23 is mounted in the slot, the arms of which engage the pulley 16 on either side, and move with the pulley when the latter is forced along the shaft by the action of the cord. Yolk 23 is attached to a long rod 24 which extends through the rotatable arm 21 and is pivotally mounted on one end of a lever 25 (see Figs. 1 and 6). Lever 25 is mounted on arm 21 and is free to rotate about a central position. The free end of this lever makes contact with a resistor element 25A (see also Fig. 6A) and thereby determines electrically the position of pulley 16.

In order to determine the extent of the motion given to shaft 17 a free arm 27 is rotatably mounted on one end of the drum axis. This arm makes contact with a resistor 28 at one end and contains a turned over portion 30 for engagement with arm 21 after that arm has been turned through a small angle. The device shown in Fig. 1 also contains a spring contact 31 positioned directly below ball 10. This spring completes a circuit to another contact point 32 when the ball is removed from its start position. A spiral spring 29 is mounted within the cylindrical drum 15 with one end secured to the drum and the other end secured to shaft 26. This spring provides the return force necessary to balance the forward thrust of the ball and its attached cord 14.

The operation of this device is as follows: When the ball 10 is struck, contacts 31, 32 are closed, thereby indicating the start of a time interval. The force given to the ball 10 pulls the cord 14 and pulley 16 so as to move shaft 17 around the periphery of drum 15. After a short angular motion arm 21 makes contact with the turned-over portion 30 of arm 27 and turns the arm around the axis of the drum. This action moves the end of arm 27 along resistance 28, the extent of such travel being determined by the force imparted to ball 10.

If the ball is struck in a direction which is perpendicular to the axis of the drum, pulley 16 will not be moved to the right or left of its central position on shaft 17 and yolk 23 and its associated lever 25 will not move from its central position on resistor unit 25A. However, if the ball is given a direction not perpendicular to the axis of drum 15, pulleys 16 will be moved along shaft 17 and arm 25 will move to the right or left of a central position on resistor 25A thereby giving an indication of the horizontal component of direction.

Arm 27 is insulated from arm 21 but after contact is made with the turned-over portion 30 these two units are electrically joined, the contact denoting the end of a time interval which was started when contacts 31, 32 were joined. This time interval is used to determine the initial velocity of the ball.

Figure 2:
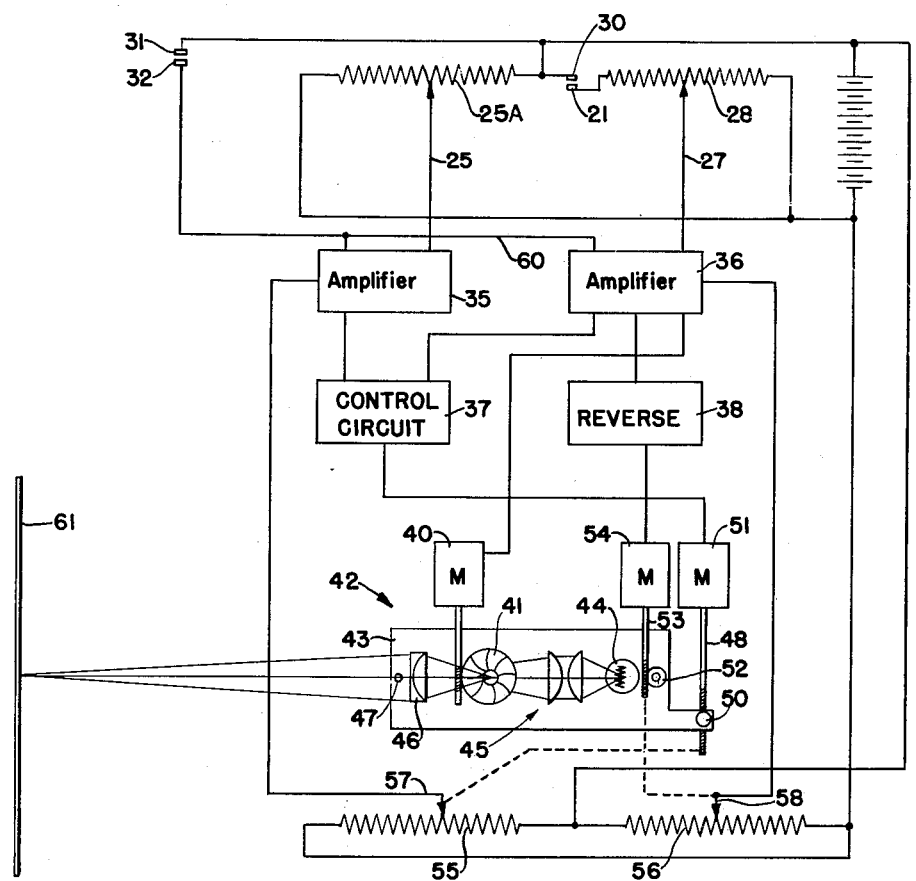
Fig. 2 is a schematic diagram containing all the main components in an analogue computing system which can be used in conjunction with the sensing system.
Figure 7:
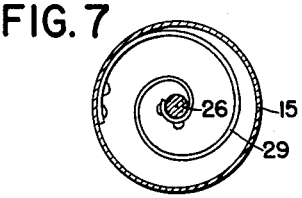
Fig. 7 is a cross sectional view of the drum 15 showing the spiral spring inside the cylindrical housing.

Referring now to Fig. 2 a schematic diagram of connections is illustrated which receives the data furnished by the device in Fig. 1 and transforms this data into a result which can be shown on indicating instruments or on a screen.

Resistor 25A is a potentiometer with a moving contact 25 which determines the direction of flight. Contacts 31, 32 indicate the start of a time interval while contacts 21, 30 indicate the end of that time interval. The distance is derived from a potentiometer 28, 27. The computing device includes two amplifiers 35, 36, a speed control circuit 37, and a motor circuit 38 which indicates the vertical movement of the ball. In order to illustrate this motion correctly on a screen it is necessary to first elevate the image of the ball and then drop the image to a ground level by reversing the motor.

In order to indicate the distance of the ball from the observer it is necessary to control the size of the image on the screen. This is done by controlling a motor 40 which opens and closes an iris diaphragm 41. A projection device 42 is mounted on a base 43 and includes a lamp 44, condensing lens 45, iris 41, and projection lens 46. The base 43 may be turned in a horizontal plane around a pivot 47 by a shaft 48 making mechanical engagement with a nut 50. Shaft 48 is turned by a motor 51 which derives its energy from control circuit 37.

The base of the projection system may be raised or lowered in a vertical direction by a screw arrangement 52 turned by shaft 53 attached to motor 54. This motor receives its energy from control circuit 38.

In order to obtain sufficient power for motors 51 and 54 a servoloop system is used. This circuit includes potentiometers 55 and 56. A mechanical connection between the shaft 48 and contact point 57 is employed to control the movement of this contact point in conjunction with contact point 25. In a similar manner a mechanical connection is employed between shaft 53 and contact point 58 to provide alignment with contact point 27.

When the missile is first struck, contacts 31, 32 are connected, sending an impulse over conductor 60 to circuit 36. When the missile has traveled far enough to cause arm 21 to make contact with turned-over portion 30, another pulse is sent to circuit 36 over conductor 27. The time interval between these pulses is transformed by circuit 36 to a value which is proportional to velocity and this value is sent to motor 40 which changes the iris diaphragm 41 at a speed which indicates the velocity and distance of the missile on a screen 61.

After the timing pulses have been received by circuit 36 and their result transmitted, the arm 27 is moved along resistor 28 an amount which is proportional to the total force given the missile. The resultant potential is impressed on circuit 36 and communicated to control circuit 38 which controls the action of motor 54, tilting the projection base 43 to cause the image of the missile on the screen to rise and fall.

Contact arm 25 is initially in the center of resistor 25A and if the missile 10 is correctly struck there will be no action. If the missile is struck in a direction to the right or left of the desired direction contact 25 will be moved and control circuit 35 transmits this change in potential to circuit 37 which controls the action of motor 51, turning the projector base 43 to the right or left about pivot point 47.

The result of all these controlling movements is a showing on screen 61 which simulates the actual flight of a struck missile. The screen 61 may also contain the likeness of an outdoor scene, such as a golf fairway to add greater realism to the screen showing.

It will be obvious that the same circuits and electrical controls may be employed to show the flight of a golf ball over a course as viewed by an observer standing to one side of the line of flight. The ball image would then travel from one side of the screen to the other in the general parabolic path taken by such missiles. While such a showing indicates distance more accurately than the first described method, it does not show direction. It is also possible to move the scenery on the screen instead of moving the image of the ball since the illusion of a ball traveling over a course depends upon the relative motion of the ball and the objects lining the fairway.

Figs. 3 and 4 show a ball 10 supported on a tee 11 secured to a base 12. A cord 14 is secured to the ball at one end and is secured to a rotatable drum 62 at its other end. Drum 62 is mounted on supporting brackets 63, one of which holds a contact point 64. A resistor 65 is secured to the end of the drum and mounted so as to make contact with point 64 after the drum has been moved through a small angle. The cord 14 passes under a pulley 16 mounted on a shaft 17 in a slot 13. Contacts 31 and 32 are mounted below base 12 in the same manner as shown in Fig. 1. In this alternate arrangement pulley 16 of Fig. 3 operates and controls the position of a sliding contact 25 on resistor 25A (not shown in Figs. 3 or 4) in the same manner as shown in Figs. 1 and 6 except that contact 25 is pivoted to the base 12 instead of a rotatable arm 21.

The operation of this device is similar to the operation of the device shown in Fig. 1. When the missile is struck by an impelling club, it moves in the general direction indicated by the arrow and pulls the cord with it, rotating the drum and moving the resistor 65 to a contact position under point 64. The disposition of pulley 16 depends, as before, on the direction of travel of the missile. The electrical potentials provided by this device are applied to the circuit shown in Fig. 2 and the results are shown on screen 61 in the same manner.

Fig. 5 shows an alternate arrangement of parts and in addition provides an indication of height or "loft" of the missile. A missile 10 is supported by a tee 11 on a base 12 and held captive by a cord 14 which passes through a slot 13. The cord passes through a ring 66 secured to a pivoted arm 67. Arm 67 can be rotated in a plane which is inclined only slightly from the horizontal and the position of the arm is determined by a contact member 68 making electrical contact with a resistor 70. A small spring 71 returns arm 67 to its central position after the operation is finished.

Arm 67 is mounted on a second rotatable arm 72 which rotates in a vertical plane on a shaft 73. A resistor 74 indicates the position of arm 72 and a weight 75 balances arms 72 and 67. Contact points 31, 32 signal the start of a time interval as before and a force-measuring device 76 gives an indication of the total force applied to the missile.

The operation of this device is similar to the operations of the devices described above. When the missile is struck by a club it travels in the general direction indicated by the arrow and pulls cord 14 after it registering the total force on unit 76 and moving the cord-following ring 66 to a position in line with the missile and unit 76. The horizontal direction is then determined by the setting of contact 68 on resistor 70 and the vertical component of direction is determined by the setting of arm 72 on resistor 74. From the foregoing description of the circuit shown in Fig. 2, the application of this device will be obvious. It should be noted that resistor 70 and contact 68 replace resistor 25A and contact 25 in the wiring diagrams of Figs. 2 and 8. Also, the resistor 74 and contact 72 of Fig. 5 replace resistor 28 and contact 27 in the same figures.

Figure 8:
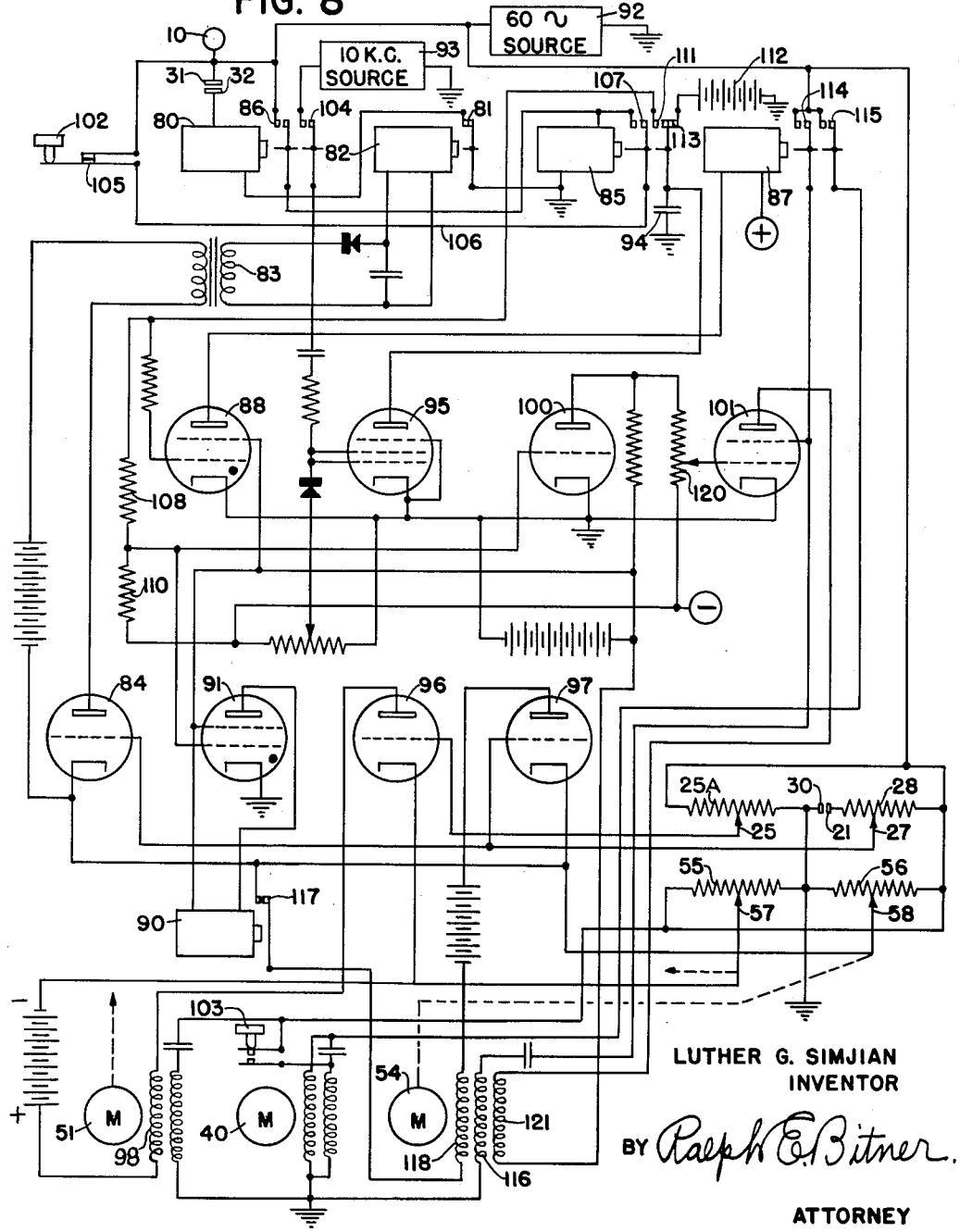
Fig. 8 is a schematic diagram of connections of the circuit shown in Fig. 2.

The detailed schematic diagram of connections shown in Fig. 8 illustrates one method of constructing a computing device which has been generally indicated in Fig. 2. This diagram shows five relays and eight amplifier electronic tubes connected so as to control the three motors 40, 51, and 54 which move the projection system. The bridge circuit in this system is energized by alternating current since it is more convenient to use alternating current motors in the practical application.

Contacts 31, 32 are directly under the ball and are closed when the ball is struck. A relay 80 is controlled by these contacts and the winding is in series with contacts 81 which are normally closed during the operation of the circuit because relay winding 82 normally receives current from a transformer 83 and a vacuum tube 84. A third relay 85 is operated by closure of contacts 86 by the first relay 80 and is normally unactuated. A fourth relay 87 is in the anode circuit of a gas tube 88 which is normally nonconducting. A fifth relay 90 is in the anode circuit of another gas tube 91 which is also normally nonconducting.

A 60 cycle source of alternating current 92 is employed to energize the bridge circuit, supply current for motors 40, 51, and 54 and to supply some of the current for operating the amplifier tubes. A 10 kilocycle source 93 is employed to furnish rectified pulses which aid in discharging a capacitor 94 through a vacuum tube 95 at a controlled rate. The sensing contacts 25, 27 in the bridge circuit are connected to control electrodes of two amplifier tubes 96 and 97 and the anodes of these tubes are connected through motor windings 98, 118 of the horizontal and vertical motors 51, 54.

The circuit which acts to bring the projected image of the ball down after it has been raised includes two amplifier tubes 100 and 101. Tube 100 is coupled to the discharge circuit which discharges the capacitor 94 while tube 101 is an inverting tube, transforming a lowering in voltage in the discharge circuit to a rise in current in its own anode circuit.

In order to reset the circuit and projection system, a series of reset circuits are employed. Two of these are indicated in Fig. 8. One reset button 102 breaks a holding circuit in the third relay 85 and permits the relay to be normalized. A second reset button 103 reverses the motor 40 which closes the iris diaphragm in the projection system. Other reset circuits break the anode supply circuits to the gas tubes to render them nonconducting.

The operation of this circuit is as follows: When the ball 10 is struck relay 80 is actuated and contacts 86 and 104 are closed. The closure of contact 86 causes the actuation of relay 85 which is then held in its actuated condition by a holding circuit which can be traced from the 60 cycle source 92 through contacts 105, over conductor 106, through contacts 107, through relay winding 85, to ground. The closure of contacts 104 causes a 10 kilocycle signal to be applied to the control electrode of tube 95 causing a more rapid decay of the charge on capacitor 94 than normally exists through bleeder resistors 108 and 110, (through closed contacts 111). Capacitor 94 is charged by battery 112 through normally closed contacts 113.

When contacts 111 are closed, the voltage charge on capacitor 94 is applied to the control electrode of gas tube 88, making it conducting and actuating relay 87, closing contacts 114 and 115. The closure of contacts 114 energizes the field winding 116 of motor 54 and also applies an alternating voltage to a control electrode in tube 101. Also at this time, due to closure of contacts 111, an alternating voltage is applied to the control electrodes of tubes 91 and 100 causing them to conduct and pass alternating current in their anode circuits. The anode current in tube 91 causes the actuation of relay 90 and closes contacts 117 and sending alternating current through winding 118 of motor 54 causing its armature to turn and raise the spot on screen 61. The anode current through tube 100 is applied to a control electrode in tube 101 by means of adjustable voltage divider 120 and the anode current from tube 101 is applied to motor winding 121 of motor 54. Winding 121 acts in a reverse manner as compared to winding 118 with the result that winding 118 first causes the image to move up at a diminishing rate, then winding 121 causes the motor to reverse and move the spot down at an increasing rate.

A short time after the ball is struck its movement causes the arm 21 to make contact with turned-over portion 30 and this closed contact energizes resistor 28 and applies an alternating voltage to contact 27. This voltage is also applied to the control electrode of amplifier tube 84 and as a result the anode current is lowered to a value which causes the normalizing of relay 82 and the opening of contacts 81. This action breaks the circuit which held the first relay 80 in an actuated condition therefore contacts 86 and 104 are opened. The opening of contacts 86 and 104 normalizes relay 85 and disconnects capacitor 94 from its discharge circuit so that the reduction in voltage on capacitor 94 is inversely proportional to the time interval between the actuation and releasing of relays 80 and 85 and is therefore a measure of the ball's velocity and the distance traveled.

While there have been described and illustrated specific embodiments of the invention, it will be obvious that various changes and modifications can be made therein without departing from the field of the invention which should be limited only by the scope of the appended claims.

I claim:

1. A golf drive sensing system for showing the trajectory of a struck missile comprising; a missile secured to one end of a flexible cord and positioned for the application of an impelling force; a force responsive device secured to the other end of the flexible cord and adapted to be actuated by the cord, said force-responsive device including electrical circuit means for producing electrical signals proportional to the force imparted to the force-responsive device; means for measuring the direction of the struck missile which includes a cord follower coupled to the flexible cord and co-acting with circuit means for producing a signal which is proportional to the direction of the stressed cord; a timing means for producing a timing signal proportional to the time interval between the application of an impelling force and the arrival of the missile at a predetermined distance from its original position; a computing means connected to the timing means and responsive to the timing signal and to signals received from the circuit means in the force-responsive device, and co-acting with the cord follower for producing signals which are proportional to the velocity of the missile and its direction; and a display means connected to the computing means and responsive to the output of said computing means for moving a display system to show the approximate trajectory of the struck missile in free flight.

2. A golf drive sensing system for showing the trajectory of a struck missile comprising; a missile secured to one end of a flexible cord and positioned for the application of an impelling force; a force responsive device secured to the other end of the flexible cord and adapted to be actuated by the cord, said force-responsive device including electrical circuit means for producing electrical signals proportional to the force imparted to the force-responsive device; means for measuring the direction of the struck missile which includes a cord follower coupled to the flexible cord and co-acting with circuit means for producing a signal which is proportional to the direction of the stressed cord; a timing means for producing a timing signal proportional to the time interval between the application of an impelling force and the arrival of the missile at a predetermined distance from its original position; said timing means including a set of electrical contacts which are operated when the missile is struck and a second set of contacts which are operated when the flexible cord is stressed; a computing means connected to the timing means and responsive to the timing signal and to signals received from the circuit means in the force-responsive device, and co-acting with the cord follower for producing signals which are proportional to the velocity of the missile and its direction; and a display means connected to the computing means and responsive to the output of said computing means for moving a display system to show the approximate trajectory of the struck missile in free flight.

3. A golf drive sensing system for showing the trajectory of a struck missile comprising; a missile secured to one end of a flexible cord and positioned for the application of an impelling force; a force-responsive device secured to the other end of the flexible cord and adapted to be actuated by the cord; said force-responsive device including a resistor secured to a portion of the device and a sliding contact secured to another portion of the device; means for measuring the direction of the struck missile which includes a cord follower coupled to the flexible cord and co-acting with a resistor and a movable contact means for producing a signal which is proportional to the direction of the stressed cord; a timing means which produces a timing signal proportional to the time interval between the application of an impelling force and the arrival of the missile at a predetermined distance from its original position; said timing means including a set of electrical contacts which are operated when the flexible cord is stressed; a computing means connected to the timing means and responsive to the timing signal and to signals received from the circuit means in the force-responsive device, and co-acting with the cord follower for producing signals which are proportional to the velocity of the missile and its direction; and a display means connected to the computing means and responsive to signals produced by it for moving a display system to show the approximate trajectory of the struck missile in free flight.

4. A golf drive sensing system as set forth in claim 3 wherein the display means comprises means for moving a controllable light projector which projects an image of the missile on a viewing screen to show the approximate trajectory of the struck missile in free flight.

5. A golf drive sensing system as set forth in claim 4 wherein the display means includes a means for controlling the diameter of the image of the missile on the viewing screen in response to one of the signals received from the computing means.

6. A golf drive sensing system as set forth in claim 3 wherein the computing means includes a servo bridge system controlled by the signals produced by the resistors in the force-responsive device and cord follower, said bridge system connected to and controlling the position of electromagnetic devices which move in response to the force-responsive device and the cord follower.

7. A golf drive sensing system as set forth in claim 3 wherein the computing means includes a charged capacitor which is connected to a discharge circuit at the start of the time interval, an electron discharge device which is made conductive by the discharged capacitor, and an amplier circuit which transforms the time interval into a current which is proportional to the velocity of the missile.

8. A golf drive sensing system for showing the trajectory of a struck missile comprising; a missile secured to one end of a flexible cord and positioned for the application of an impelling force; a force-responsive device secured to the other end of the flexible cord and adapted to be actuated by the cord when stressed; said force-responsive device including a resistor secured to a portion of the device and a sliding contact secured to another portion of the device; means for measuring the direction of the struck missile which includes a cord follower coupled to the flexible cord and co-acting with a resistor and a movable contact means for producing a signal which is proportional to the direction of the stressed cord; a computing means connected to said force-responsive device and to the cord follower for producing electrical signals which are proportional to the range of the missile in free flight and its direction; and a display means connected to the computing means and responsive to signals produced by it for moving a display system which shows the approximate trajectory of the struck missile in free flight.

References Cited in the file of this patent

UNITED STATES PATENTS

| | | |
|---|---|---|
| 1,229,309 | Morse | June 12, 1917 |
| 1,566,775 | Schenk | Dec. 22, 1925 |
| 1,857,267 | Tyler et al. | May 10, 1932 |
| 2,608,864 | Wagner | Sept. 2, 1952 |